United States Patent [19]

Baker et al.

[11] 4,016,774
[45] Apr. 12, 1977

[54] RACK AND PINION STEERING GEAR

[75] Inventors: Donald J. Baker; Robert W. Jackson, both of South Bend, Ind.

[73] Assignee: The Bendix Corporation, South Bend, Ind.

[22] Filed: Dec. 19, 1975

[21] Appl. No.: 642,290

[52] U.S. Cl. .................................. 74/424.6; 74/29; 74/422; 74/498

[51] Int. Cl.$^2$ ................... F16H 1/18; F16H 19/04; F16H 1/04; B62D 1/20

[58] Field of Search ............. 74/424.6, 388 PS, 29, 74/498, 422, 409, 485

[56] References Cited

UNITED STATES PATENTS

| | | | |
|---|---|---|---|
| 3,369,425 | 2/1968 | Runkle et al. | 74/409 X |
| 3,792,624 | 2/1974 | Pitner | 74/498 X |

FOREIGN PATENTS OR APPLICATIONS

| | | | |
|---|---|---|---|
| 1,213,241 | 3/1960 | France | 74/422 |

Primary Examiner—Leonard H. Gerin
Attorney, Agent, or Firm—Ken C. Decker; William N. Antonis; Paul D. Schoenle

[57] ABSTRACT

A rack and pinion steering gear for automotive vehicles includes a housing having a longitudinal bore in which the rack reciprocates and a cross bore in which the pinion which meshes with the rack is rotatably mounted. The rack is slidably mounted in the bore by an annular bearing, a portion of which is cut away to receive the pinion. A leaf spring is disposed in a groove provided in the wall of the bore and extending parallel thereto. The leaf spring bears against the side of the annular bearing member opposite the cut-away portion to thereby maintain the rack into meshing engagement with the pinion. The pinion is rotatably supported in the cross bore by a bearing arrangement which is designed so that substantially the same components may be used in either manual or power assisted steering gears.

16 Claims, 3 Drawing Figures

RACK AND PINION STEERING GEAR

BACKGROUND OF THE INVENTION

This invention relates to a rack and pinion steering gear for an automotive vehicle.

The rack and pinion steering gear disclosed herein includes an arrangement which yieldably maintains the rack in meshing engagement with the pinion. Because a rack and pinion steering apparatus is subjected to road stresses, the rattling effect of these stresses sometimes causes the pinion to become separated from the rack a very small amount, thereby changing the steering "feel" of the vehicle operator. Such a condition is obviously undesirable, and many arrangements have been suggested in the past to maintain the rack and pinion in meshing engagement. The arrangement disclosed in this application solves this problem in a better and a more cost-effective way than the apparatus known to the prior art.

The invention disclosed herein also includes a novel bearing arrangement which supports the pinion for rotation. This pinion bearing arrangement not only accounts for an axial thrust to which the pinion shaft is subjected when it is in use in a motor vehicle, but it is also designed so that substantially the same components may be used in both the manual rack and pinion steering gear disclosed herein, and the power rack and pinion steering gear, disclosed in copending application Ser. No. 642,280, filed Dec. 19, 1975, owned by the assigned of the present invention and incorporated herein by reference. The rack, the pinion, the housing, and the bearings are common to both the manual and the power rack and pinion mechanisms, and only a few additional components, such as a rotary valve and a manifolding fluid motor arrangement, need be added to the basic manual design in order to provide a power assist capability.

SUMMARY OF THE INVENTION

Therefore, an important object of our invention is to provide an improved capability for yieldably maintaining the rack in meshing engagement with the pinion in a rack and pinion steering gear.

Another important object of our invention is to provide an improved bearing arrangement for supporting the pinion and pinion shaft in the cross bore of a rack and pinion power steering gear.

Still another important object of our invention is to assure that all the component parts used in our power steering gear are also usable in a corresponding power rack and pinion gear, the power gear requiring only a few additional components to provide a power assist to the vehicle operator.

DETAILED DESCRIPTION

Figure 1:
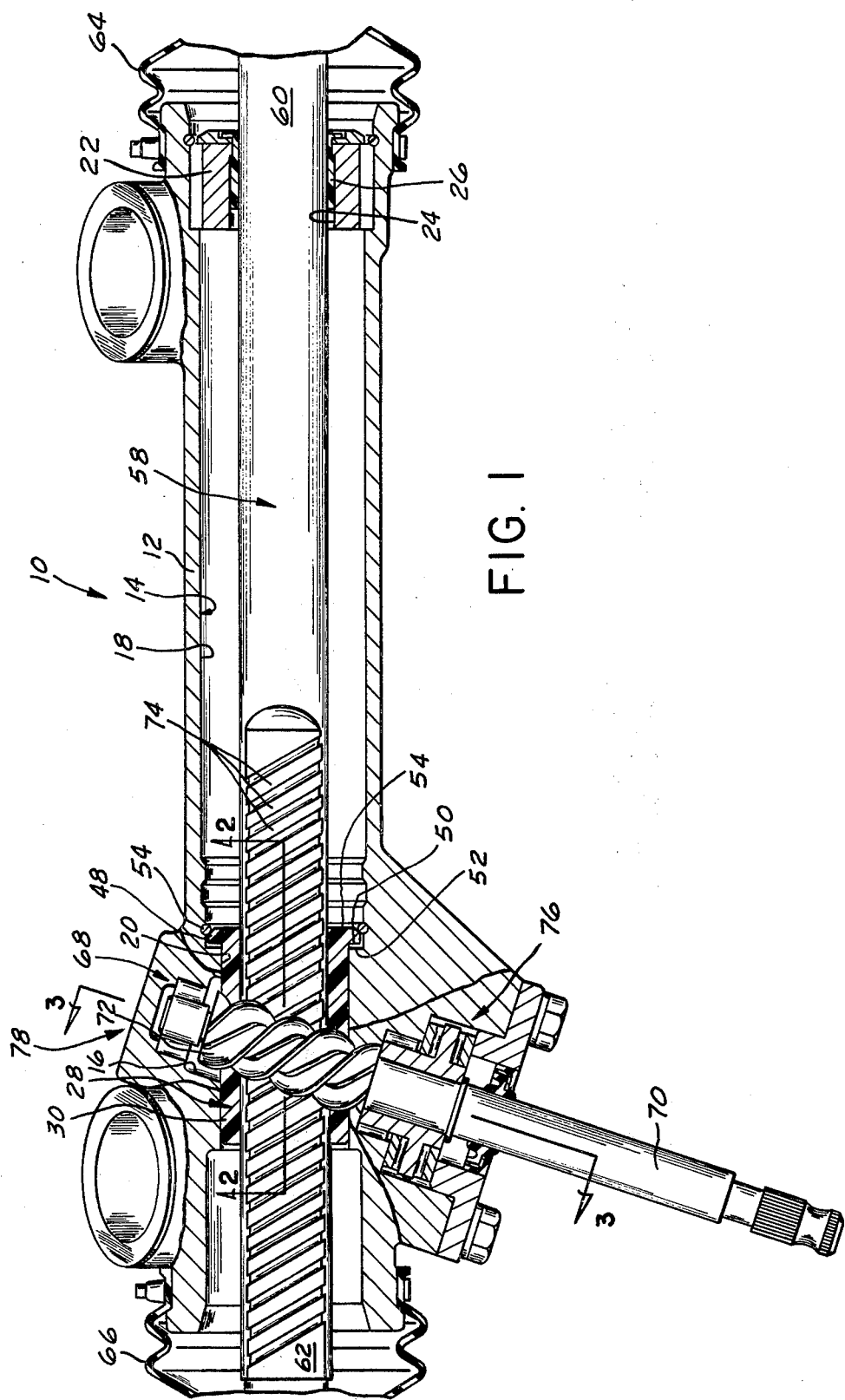
FIG. 1 is a fragmentary, longitudinal cross-sectional view of a power steering gear made pursuant to the teachings of our present invention.
Figure 2:
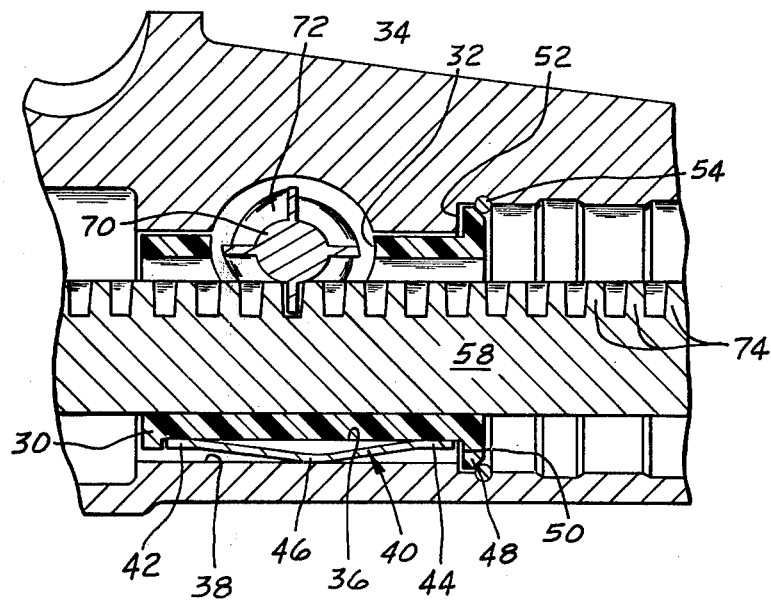
FIG. 2 is a fragmentary, cross-sectional view taken substantially along lines 2—2 of FIG. 1.
Figure 3:
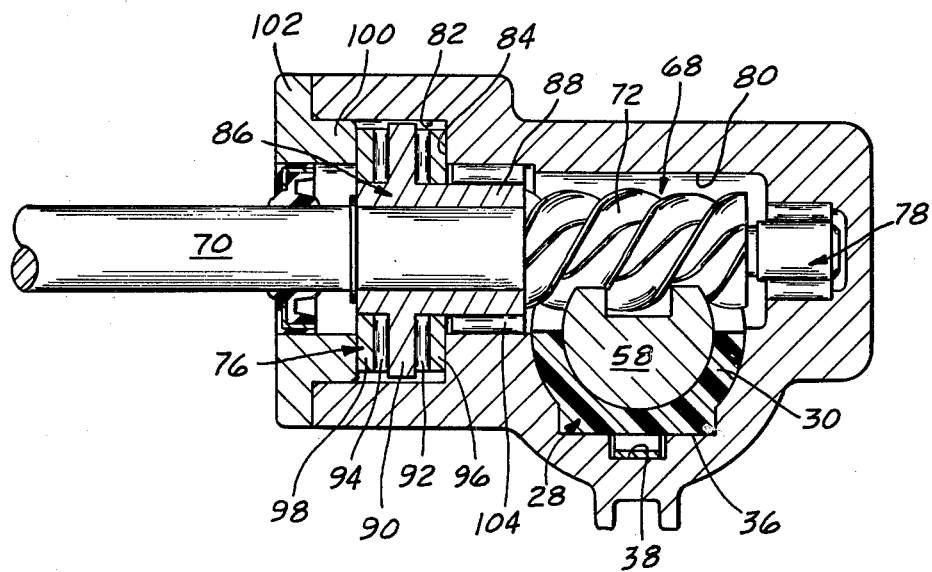
FIG. 3 is a cross-sectional view taken substantially along lines 3—3 of FIG. 1.

Referring now to the drawings, a rack and pinion gearing generally indicated by the numeral 10 includes a housing 12 which defines a longitudinal bore 14 and cross bore 16 intersecting the longitudinal bore 14. The longitudinal bore 14 is stepped to define a larger diameter portion 18 and a smaller diameter portion 20. A plug 22 is received in the open end of the larger portion 18 of the bore 14 and is provided with an aperture 24 in which an annular bearing 26 is received. Another annular bearing 28 is received in the smaller diameter portion 20 of the bore 14, and a portion of the circumferential wall 30 of the bearing 28 is cut away as at 32 to define an opening 34 at the intersection of the cross bore 16 and the longitudinal bore 14. The side of the angular bearing 28 opposite the opening 34 is provided with a substantially flat surface 36 which covers a groove 38 provided in the wall of the smaller portion 20 of the bore 14. A leaf spring 40 is received in the groove 38 and extends substantially parallel to the axis of the longitudinal bore 14. The opposite ends 42, 44 of the leaf spring 40 bear against the annular bearing 28, and the mid portion 46 of the spring 40 engages the bottom of the groove 38, so that leaf spring 40 exerts a yielding force on the bearing 28, urging the latter upwardly viewing FIG. 2. The right-hand end, viewing FIG. 1, of the annular bearing 28 terminates in a radially projecting lip 48, one edge 50 of which faces the shoulder 52 defined between the larger and smaller diameter portion of the bore 14. A snap ring 54 engages the opposite face 56 of the lip 48 to thereby maintain the bearing 28 in the position illustrated in the drawings.

A rack 58 is slidably supported in the longitudinal bore 14 by the bearing 26 in the plug 22 and by the bearing 28. The opposite ends 60, 62 of the rack 58 extend from the corresponding ends of the bore 14 and are operatively connected to the right and left wheels, respectively, of the vehicle in a manner well known to those skilled in the art. The ends 60, 62 of the rack 58 are protected by conventional boots 64, 66.

A pinion assembly generally indicated by the numeral 68 is rotatably mounted in the cross bore 16. Assembly 68 includes a pinion shaft 70 which extends from the end of the bore 16 and a pinion 72 which is fixed to the shaft 70 and which is received in the opening 34 of the annular bearing 28 at the intersection of the cross bore 16 and the longitudinal bore 14. The teeth on the pinion 72 mesh with the teeth 74 on the rack 58, and the spring 40 bearing against the annular bearing 28 yieldably maintains the teeth 74 of the rack 58 in meshing engagement with the teeth of the pinion 72. The shaft 70 is operatively connected to the vehicle steering wheel, so that the latter, and therefore the pinion 72, is rotated in a clockwise direction when a right-hand turn is effected and a counterclockwise direction when a left-hand turn is effected.

The pinion assembly 68 is rotatably supported in the cross bore 16 by first bearing means generally indicated by the numeral 76 on one side of the intersection between the cross bore 16 and longitudinal bore 14 and by bearing means generally indicated by the numeral 78 on the opposite side of the intersection between the bores 14 and 16. The bearing means 78 is a conventional roller bearing and will not be described in further detail herein. The cross bore 16 is stepped to define a smaller diameter portion 80, and a larger diameter portion 82 with a shoulder 84 therebetween. Bearing means 76 includes a hardened bearing race 86 having an annular portion 88 which is press fitted on the pinion shaft 70 and which carries a radially extending portion 90 which projects into the larger diameter portion of the bore 82. Two sets of bearing elements 92, 94 are located between opposite sides of the radially extending portion 90 of the bearing race 86, a second bearing race 96, which is disposed against the shoulder 84, and a third bearing race 98. The bearing race 98 is retained in the position illustrated in the drawings by an annular lip 100 which projects from a cover member 102 which closes the open end of the bore 16 through which the pinion shaft 70 extends. The bearing races 90, 96 and 98, and bearing elements 92 and 94, are designed to take axial thrusts exerted on the pinion shaft 70. The shaft 70 is supported for rotation by the bearing means 78 and by bearing elements 104 which are located between the annular portion 88 of bearing race 86 and the smaller portion of the bore 16. The ends of the bearing elements 104 rest against the opposite side of the bearing race 96.

It should be noted that the manual power steering unit illustrated in the drawings may also be manufactured with a power assist using the same basic components illustrated in the figures, by adding a few additional components to provide the power assist. For example, the cover 102 with the lip 100 replaced by valve housing having a lip to retain the bearing race 98, and a manifolding arrangement may be placed in the larger diameter portion 18 of the longitudinal bore 14, between the rack 58 and the wall of the bore 14. Such a construction is disclosed in the aforementioned copending U.S. patent application Ser. No. ACSG 75-74A, owned by the assignee of the present invention and incorporated herein by reference.

In operation, when a right-hand turn is effected, the steering wheel, and therefore the pinion shaft 70, is rotated in a clockwise direction. Because of the meshing engagement with the pinion 72 and the rack 58, clockwise rotation of the pinion urges the rack 58 to the left viewing the Figure. Since the ends 60 and 62 of the rack 58 are connected to the left and right-hand wheels of the vehicle, respectively, movement of the rack 62 to the left pivots the wheels in a clockwise direction, therefore effecting the right-hand turn. On the other hand, a left-hand turn may be effected by rotating the steering wheel, and therefore the pinion shaft 70, in a counterclockwise direction, thereby urging the rack 58 to the right viewing the Figure, and pivoting the wheels in a counterclockwise direction, thereby effecting a left-hand turn. Throughout steering maneuvers, the leaf spring 40 bears against the flat portion 36 of the angular bearing 28 and exerts a yieldable load through the bearing 28 to the rack 58 to yieldably maintain the latter in meshing engagement with the pinion 72. This arrangement prevents undesirable "backlash" from occurring due to momentary separations between the pinion and the rack.

We claim:

1. In a rack and pinion and steering gear assembly, a housing defining a longitudinal bore and a cross bore therewithin, said longitudinal bore being stepped to define larger and smaller sections with a shoulder therebetween, said cross bore intersecting said longitudinal bore at the smaller diameter section of the latter, a pinion rotatably mounted in said cross bore at the intersection of the latter with said longitudinal bore, a rack slidably supported in said longitudinal bore by said smaller section of the latter, and meshing with said pinion, an annular bearing member located in the smaller portion of the longitudinal bore for supporting said rack, said annular bearing having an opening for receiving said pinion, and resilient means acting against said bearing means to yieldably urge the latter and therefore said rack toward said pinion, whereby the bias exerted by said resilient means against said annular bearing yieldably maintains said rack in meshing engagement with said pinion.

2. The invention of claim 1, wherein said opening receiving said pinion is in the circumferential wall of said bearing, said resilient means being a leaf spring extending substantially parallel to the axis of said longitudinal bore, said leaf spring having portions engaging the wall of said housing and the circumferential surface of said annular bearing.

3. The invention of claim 2, wherein a groove is provided in said smaller portion of said longitudinal bore, said groove extending substantially parallel to the axis of said bore, said leaf spring being located in said groove.

4. The invention of claim 3, wherein said annular bearing has a substantially flat side opposite said opening receiving the pinion, said flat side engaging said leaf spring and covering said groove.

5. The invention of claim 1, said opening receiving said pinion is in the circumferential wall of said annular bearing, said annular bearing having a substantially flat side opposite said opening, said resilient means engaging said flat side.

6. The invention of claim 5, wherein said resilient means being a leaf spring extending substantially parallel to the axis of the annular bearing, said leaf spring having portions bearing against said flat portion and against the wall of said housing.

7. The invention of claim 1, wherein said annular bearing includes a radially projecting lip extending from the center circumferential surface of said bearing, one edge of said lip cooperating with said shoulder when the annular bearing is installed in the smaller portion of said longitudinal bore to locate said annular bearing within said longitudinal bore, and retaining means engaging the opposite edge of said lip.

8. The invention of claim 7, wherein said retaining means is a snap ring engaging the wall of the larger portion of said longitudinal bore and also engaging said opposite edge of said lip.

9. The invention of claim 7, wherein said opening receiving said pinion is in the circumferential wall of said annular bearing, said annular bearing having a substantially flat side opposite said opening, said resilient means engaging said flat side.

10. The invention of claim 9, wherein said resilient means being a leaf spring extending substantially parallel to the axis of the annular bearing, said leaf spring having portions bearing against said flat portion and against the wall of said housing.

11. In a rack and pinion steering gear assembly, a housing defining a longitudinal bore and an open-ended cross bore therewithin, said cross bore intersecting said longitudinal bore, a pinion, means rotatably mounting said pinion in said cross bore at the intersection of said cross bore with said longitudinal bore, a rack slidably mounted in said longitudinal bore and meshing with said pinion, said rotatably mounting means including a pinion shaft mounting said pinion, a pair of axially spaced radial bearings supporting said pinion shaft for rotation within said cross bore, and thrust bearing means for resisting axial movement of the pinion shaft, means for closing said cross bore, said closing means including means extending into said cross bore and engaging said thrust bearing means to position the latter within said cross bore, said closing means comprising a substantially flat cover plate with an axial opening therein through which said pinion shaft extends, said means extending into said cross bore being an annular lip extending from one side of said cover plate and circumscribing said axial opening.

12. In a rack and pinion steering gear assembly, a housing defining a longitudinal bore and an open-ended cross bore therewithin, said cross bore intersecting said longitudinal bore, a pinion, means rotatably mounting said pinion in said cross bore at the intersection of said cross bore with said longitudinal bore, a rack slidably mounted in said longitudinal bore and meshing with said pinion, said rotatably mounting means including a pinion shaft mounting said pinion, a pair of axially spaced radial bearings supporting said pinion shaft for rotation within said cross bore, and thrust bearing means for resisting axial movement of the pinion shaft, means for closing said cross bore, said closing means including means extending into said cross bore and engaging said thrust bearing means to position the latter within said cross bore, said closing means comprising a valve housing covering the open end of said cross bore and receiving said pinion shaft, said means extending into said cross bore being an annular lip extending from one end of said valve housing.

13. In a rack and pinion steering gear assembly, a housing defining a longitudinal bore and an open-ended cross bore therewithin, said cross bore intersecting said longitudinal bore, a pinion, means rotatably mounting said pinion in said cross bore at the intersection of said cross bore with said longitudinal bore, a rack slidably mounted in said longitudinal bore and meshing with said pinion, said rotatably mounting means including a pinion shaft mounting said pinion, a pair of axially spaced radial bearings supporting said pinion shaft for rotation within said cross bore, and thrust bearing means for resisting axial movement of the pinion shaft, means for closing said cross bore, said closing means including means extending into said cross bore and engaging said thrust bearing means to position the latter within said cross bore, said means projecting into said bore comprising an annular lip extending from said closing means, said cross bore being stepped to define larger and smaller diameter sections with a shoulder therebetween, said thrust bearing means including a first race carried by said pinion shaft and extending radially therefrom, a second race positioned by said shoulder, a third race positioned by said lip, and bearing elements located between said first and second races and between said first and third races.

14. In a rack and pinion steering gear assembly, a housing defining a longitudinal bore and a open-ended cross bore therewithin, said cross bore intersecting said longitudinal bore, a pinion, means rotatably mounting said pinion in said cross bore at the intersection of said cross bore with said longitudinal bore, a rack slidably mounted in said longitudinal bore and meshing with said pinion, said rotatably mounting means including a pinion shaft mounting said pinion, a pair of axially spaced radial bearings supporting said pinion shaft for rotation within said cross bore, and thrust bearing means for resisting axial movement of the pinion shaft, means for closing said cross bore, said closing means including means extending into said cross bore and engaging said thrust bearing means to position the latter within said cross bore, said longitudinal bore being stepped to define larger and smaller portions with a shoulder therebetween, said rack being supported by said smaller portion of said bore, said cross bore and said longitudinal bore intersecting at the smaller portion of the latter, said pinion shaft extending across said longitudinal bore.

15. The invention of claim 14, and an annular bearing located in the smaller portion of said longitudinal bore and supporting said rack for sliding movement in said longitudinal bore, said annular bearing being cut away to define an opening at the intersection between said longitudinal and cross bores to accommodate said pinion and said pinion shaft, and resilient means bearing against said annular bearing to urge said rack into meshing engagement with said pinion.

16. The invention of claim 15, wherein said annular bearing has a substantially flat side opposite said opening receiving the pinion, said flat side engaging said leaf spring and covering said groove.

* * * * *